J. H. & G. H. HEEREN.
DEMOUNTABLE RIM.
APPLICATION FILED JUNE 22, 1916.
1,256,316.
Patented Feb. 12, 1918.
2 SHEETS—SHEET 2.
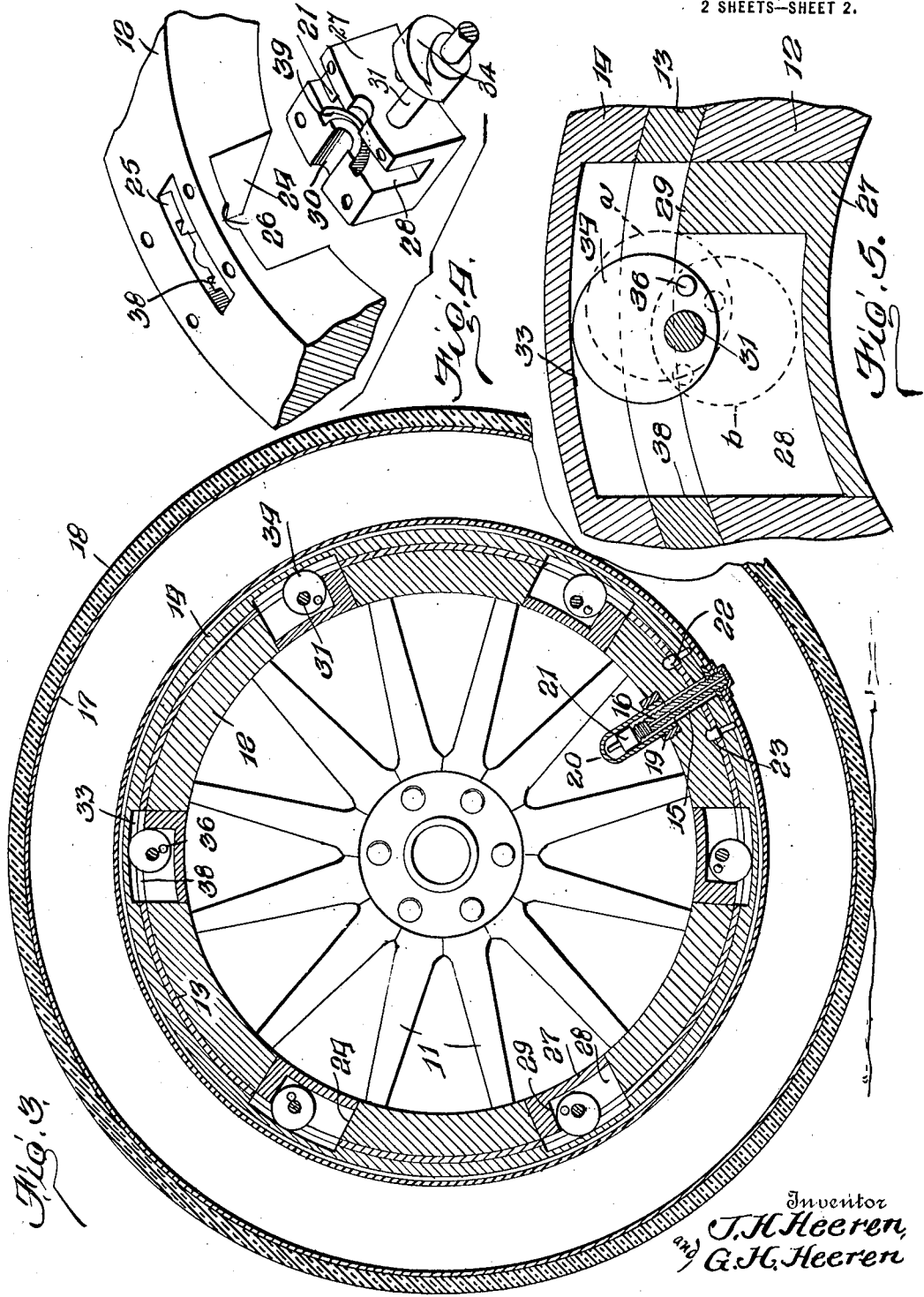
Inventor
J. H. Heeren,
and
G. H. Heeren
By
Attorneys.

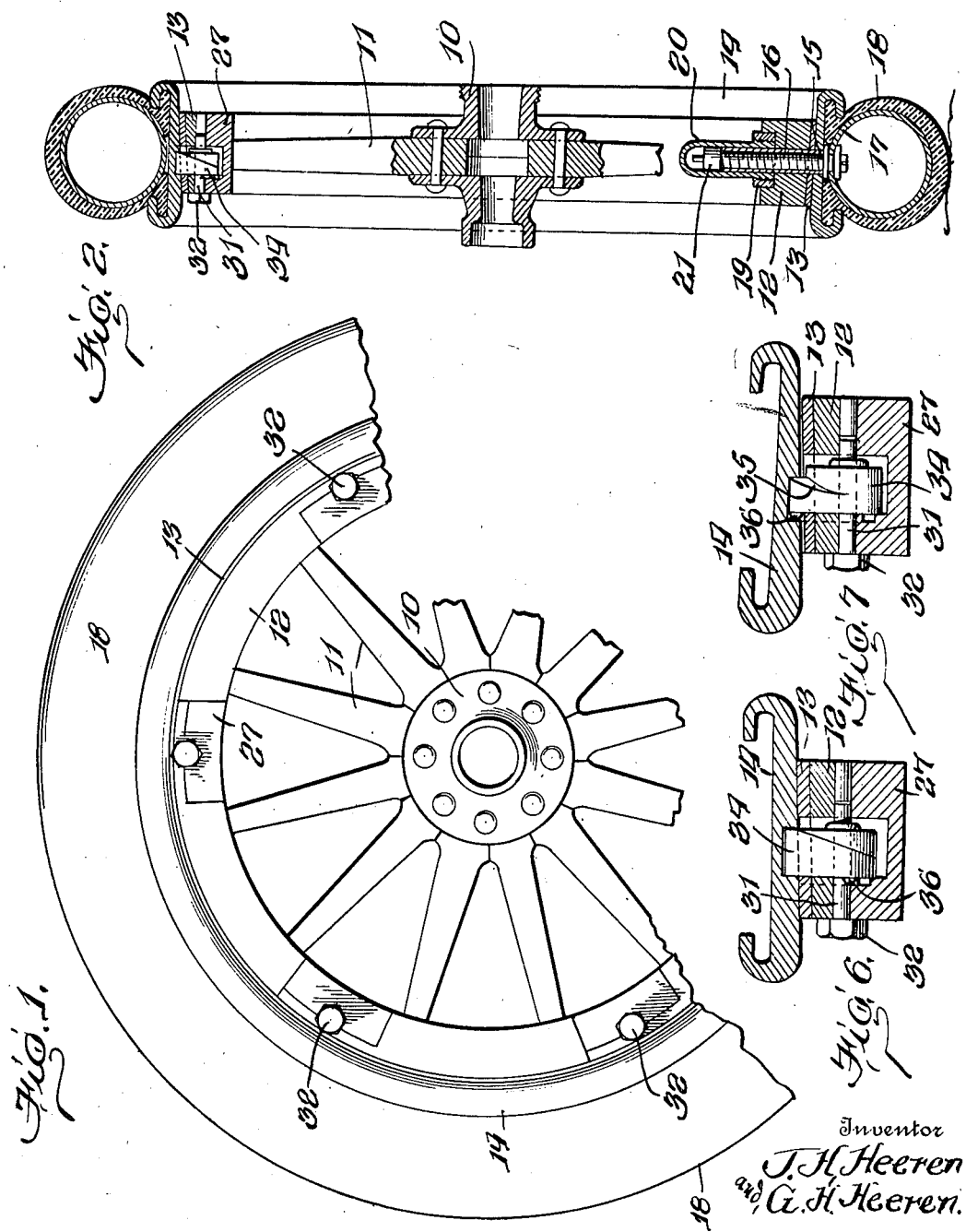

UNITED STATES PATENT OFFICE.

JOHN H. HEEREN AND GARRY H. HEEREN, OF ALCESTER, SOUTH DAKOTA.

DEMOUNTABLE RIM.

1,256,316.   Specification of Letters Patent.   Patented Feb. 12, 1918.

Application filed June 22, 1916. Serial No. 105,259.

*To all whom it may concern:*

Be it known that we, JOHN H. HEEREN and GARRY H. HEEREN, citizens of the United States, residing at Alcester, in the county of Union and State of South Dakota, have invented certain new and useful Improvements in Demountable Rims, of which the following is a specification.

Our invention relates to new and useful improvements in vehicle wheels and more particularly to wheel and rim constructions for use upon motor vehicles employing pneumatic or other types of cushion tires, the primary object of our invention being the provision of an improved form of demountable rim and wheel.

A further object of our invention consists in the provision of a demountable rim which may be locked in place by fastening devices permanently secured to the felly of the wheel and which do not include any nuts which must be removed or other parts which, when removed, are apt to be lost or injured.

A still further object of our invention consists in constructing a wheel and demountable rim of such a character that the rim is locked upon the felly of the wheel by means of cams, the cams being arranged to clamp the rim in proper position when they are moved into locking engagement with it and to loosen the rim with respect to the felly when they are moved out of such engagement.

Another object which we have in view is the provision of a wheel rim and felly construction of such a type that the rim, together with a pneumatic tire and tube may be removed from the wheel without the necessity of removing either the cap covering the valve sleeve or the exterior dust cap surrounding the valve sleeve, it being necessary to remove these caps only when the tire is to be inflated.

With these and other objects in view, our invention will be more fully described, illustrated in the accompanying drawings, and then specifically pointed out in the claims which are attached to and form a part of this application.

In the drawings:

Figure 1 is a fragmentary side elevation of a wheel constructed in accordance with our invention;

Fig. 2 is a central vertical sectional view taken transversely of the wheel;

Fig. 3 is a corresponding view taken at right angles to the section shown in Fig. 2;

Fig. 4 is a fragmentary perspective view showing a portion of the felly and one of the locking cams and its housing, the parts being separated to more clearly show certain details of construction;

Fig. 5 is a fragmentary enlarged section corresponding to the showing in Fig. 3, but illustrating the cam in its various positions;

Fig. 6 is a section upon an enlarged scale corresponding to that shown in Fig. 2, the cam being shown in locked position;

Fig. 7 is a view corresponding to Fig. 6, but showing the cam in partially unlocked position.

Corresponding and like parts are referred to in the following description and indicated in all the views of the drawings by the same reference characters.

Our improved wheel and rim structure includes a wheel having the usual hub 10 and spokes 11 and a felly 12 in which are secured the outer ends of the spokes. This felly is preferably formed of wood in the usual manner and is surrounded by a steel or iron band 13 to protect the wood and also to prevent binding between the felly and demountable rim, due to possible swelling of the wood because of moisture. Either the band or, in the present case, the felly and band are so constructed that the peripheral outer face of the band is inclined toward the center of the wheel from the inner to the outer edge of the wheel providing a frusto-conical rim receiving surface.

A rim 14 is provided having its inner peripheral surface frusto-conical to engage snugly against the corresponding surface of the felly band 13 when the rim is in proper applied position, as clearly shown in Figs. 2, 6 and 7 of the drawings. This rim may be of the endless clencher type, as shown in the drawings, or it may be of a type adapted for quick detachable or straight side tires, as preferred. If not of the clencher type, the rim will be split or transversely divided and formed of resilient metal and applied in a manner which will be later explained. The rim at one point is, of course, formed with an opening 15 for the passage of the valve sleeve 16 of the inner tube 17 which, as usual, is inclosed within a shoe or casing 18. The felly 12 and its reinforcing band 13 are, of course, formed with alined openings for the passage of the valve sleeve 16 and threaded or otherwise anchored in the inner end of the opening of the felly is an internally threaded sleeve 19 adapted to receive the dust cap 20 which surrounds the valve cap 21 and outer portion of the valve sleeve 16. Because of the frusto-conical engaging surfaces of the felly band and rim, it will be apparent that the rim may be readily slipped from the felly and if that portion of the rim opposite the valve sleeve 16 is first started from the felly, the rim may be tilted to such an extent as to permit its removal, together with the tire casing, tube and valve sleeve 16, without necessitating the removal of either the dust cap 20 or valve cap 21. In order to assist in the proper positioning of the rim upon the felly, pins 22 are anchored in the rim projecting inwardly in peripherally spaced relation at either side of the valve sleeve receiving opening 15 to seat in shallow sockets 23 formed in the outer peripheral face of the felly and its band when the rim is in place.

The felly, at properly spaced intervals, is cut-away to provide substantially rectangular seats 24 opening through the inner peripheral face of the felly and through the side walls thereof and is further cut-away to provide slots 25 communicating throughout their length with the recesses 24, opening through the outer peripheral face of the felly and its band and extending peripherally of the felly. The outer or bottom walls of the recesses 24 are formed with transverse semi-cylindrical grooves 26 which form alined half bearings at either side of the slots 25. Mounted within each of these recesses is a housing 27, formed of steel or other suitable metal and proportioned to entirely fill the recesses and present with the wheel felly a smooth uninterrupted surface. The inner faces of these casings 27 are formed with longitudinal channels or chambers 28 which aline with the slots 25 and which, at one end, are partially closed to provide stop shoulders 29. The inner faces of these casings are further transversely grooved or channeled, as shown at 30, to provide with the grooves or channels 26 cylindrical bearings or rotatable pins 31 having integrally formed angular heads 32 which project beyond the outer face of the felly and by means of which the pins may be turned. The felly and casing 27 are provided with suitable alined bolt or screw receiving openings so that the casings may be secured in place. The inner peripheral face of the rim is formed at spaced intervals with peripherally extending grooves or channels 33 corresponding in length and width to the slots 25 and formed at such portions of the rim as to register with these slots when the rim is in place upon the felly. Cams, indicated as a whole by the numeral 34, are integral with the pins 31 to rotate therewith and are proportioned to seat wholly within the grooves or channels 28 of the casings 27 in one position or to project partially into the grooves or chanels 33 of the rim in another position to lock the rim against lateral movement with respect to the felly, the rim of course being held against other movement by the pins 22.

More specifically, these cam members 34 are in the general shape of a disk formed eccentrically upon the pins, one face of the disk being plane surfaced, while the other is cut-away to provide an inclined wedging or cam surface 35, this cutting away being so done that the most eccentric portion of the cam is substantially the thickest portion, while the less eccentric portion is the thinnest, the thickest portion of the cam being substantially equal in thickness to the width of the slots 25 and of the grooves or channels 33 of the rim. Because of this, when the locking cams are swung to the position shown in Figs. 3 and 5 of the drawings, the thickest portions of the cams are seated in the grooves or channels 33 and the inclined or cam faces 35 of the cams, which are the outer faces, have acted against the outer walls of the grooves or channels 33 to force the rim inwardly with respect to the felly to its proper position so that it is tightly clamped upon the felly. These cams are arranged to swing, when in fully locked position, to the position shown in dotted lines at A in Fig. 5 and in unlocked position, to the position shown in dotted lines at B in the same figure. Obviously, in the latter position, the cams do not project beyond the felly band 13, while in the former position they project into the grooves or channels 33 of the rim 14 and also engage against the stop shoulders 29, having been swung past dead center. Because of this, there is no tendency for the cams to turn back to unlocked position and the rim will not work loose.

Preferably, the opposite or plane surfaced face of the cams is formed with a slight projection 36 disposed adjacent the peripheral edge of the cam and at that portion of the face opposite substantially the midportion of the inclined face 35 of the cam. The inner side wall of the slotted portion of the casing 27 is cut-away, as shown at 37, to receive this projection 36 during turning of the cam and the felly and its band are correspondingly cut-away for the same purpose, as shown at 38. When the cams are being turned from the position shown at A in Fig. 5 to the position shown at B in the same figure, these projections 36 engage the inner side walls of the grooves or channels 33 of the rim and act to force the rim outwardly a slight extent or transversely of the felly so as to loosen it from the felly and facilitate its removal in case it becomes bound to the felly through rust or corrosion. If desired, this wall of the groove or channel 33 may be slightly cut-away adjacent the point of engagement with the projection 36 to facilitate this action. The manner in which this projection operates through turning of the cam will release the rim, as clearly illustrated in Figs. 6 and 7.

Although the demountable rim shown in the drawings and above described is of the endless clencher type, it will be apparent that other types of rims may be employed. For instance, split rims for quick detachable and straight side tires may be employed, the rims, under such circumstances, being split at the point of passage of the valve sleeve so that the pins 22 may serve as a means for anchoring the abutting ends of the rim against independent movement when the rim is in place. As split rims are well known, it is believed that there is not necessity for illustration.

In view of the above description, taken in connection with the drawings, the manner of applying and removing demountable rims from wheels, when constructed in accordance with our invention, will be readily understood and no further explanation is necessary. We wish, however, to direct attention to the fact that no part of the rim fastening means is detachable so that there is no likelihood of loss of parts and to the further fact that the rims, together with their tires and tubes, may be removed from the wheel without removing the dust and valve caps of the tire.

Having thus described the invention, what is claimed as new is:

1. In wheel construction, a wheel body having a frusto-conical peripheral face, a wheel rim having an inner frusto-conical peripheral face engageable with the corresponding face of the wheel body, the inner face of the rim being formed with peripherally extending grooves parallel to its sides, and locking devices carried by the wheel body and projectable into the grooves, said locking devices having cam faces whereby during their movement out of engagement with the rim they will move the rim transversely of the wheel body to loosen it therefrom.

2. In wheel construction, a wheel body having a frusto-conical peripheral face, a wheel rim having an inner frusto-conical peripheral face engageable with the corresponding face of the wheel body, the inner face of the rim being formed with peripherally extending grooves parallel to its sides, and locking devices carried by the wheel body and projectable into the grooves, said locking devices having cam faces whereby their projection into the grooves will force the rim transversely of the wheel body to bind it in place, and additional cam faces adapted during movement of the locking devices out of engagement with the rim for moving the rim transversely of the wheel body in the opposite direction to loosen it from the wheel body.

3. In wheel construction, a felly, a rim adapted to be detachably mounted about the felly and formed in its inner face with peripherally extending spaced channels parallel to its sides, the felly being formed with seats and slots communicating with the seats and opening through the outer face of the felly to register with the channels, housings mounted in the seats, pins journaled in the housings, locking disks separately carried by the pins to be projected through the slots of the felly into the channels of the rim, said disks each being formed with a cam face engageable with one side wall of the channels to force the rim transversely of the felly during turning of the disks, the locking disks being adapted to be turned past dead center to lock the rim, and stop shoulders in the seats for preventing further turning of the disks whereby their release is prevented.

In testimony whereof we affix our signatures.

JOHN H. HEEREN. [L. S.]
GARRY H. HEEREN. [L. S.]